(12) United States Patent
Kupratis et al.

(10) Patent No.: US 10,094,279 B2
(45) Date of Patent: Oct. 9, 2018

(54) REVERSE-FLOW CORE GAS TURBINE ENGINE WITH A PULSE DETONATION SYSTEM

(71) Applicant: UNITED TECHNOLOGIES CORPORATION, Hartford, CT (US)

(72) Inventors: Daniel B. Kupratis, Wallingford, CT (US); Francis R Moon, Granby, CT (US)

(73) Assignee: United Technologies Corporation, Farmington, CT (US)

( * ) Notice: Subject to any disclaimer, the term of this patent is extended or adjusted under 35 U.S.C. 154(b) by 395 days.

(21) Appl. No.: 14/764,186

(22) PCT Filed: Jan. 29, 2013

(86) PCT No.: PCT/US2013/023565
§ 371 (c)(1),
(2) Date: Jul. 29, 2015

(87) PCT Pub. No.: WO2014/120115
PCT Pub. Date: Aug. 7, 2014

(65) Prior Publication Data
US 2015/0377125 A1 Dec. 31, 2015

(51) Int. Cl.
*F02C 3/14* (2006.01)
*F02K 3/11* (2006.01)
(Continued)

(52) U.S. Cl.
CPC .............. *F02C 3/145* (2013.01); *F02C 3/107* (2013.01); *F02C 3/14* (2013.01); *F02C 5/02* (2013.01); *F02C 7/06* (2013.01); *F02C 7/36* (2013.01); *F02K 3/06* (2013.01); *F02K 3/11* (2013.01); *F23G 7/065* (2013.01); *F23R 7/00* (2013.01);
(Continued)

(58) Field of Classification Search
CPC .. F02C 3/145; F02C 3/107; F02C 3/14; F02C 7/36; F02C 7/06; F02C 5/02; F23R 7/00; F23G 7/065; F02K 3/06; F02K 3/11; F05D 2250/31; F05D 2250/311; F05D 2260/16
See application file for complete search history.

(56) References Cited

U.S. PATENT DOCUMENTS 2,635,420 A * 4/1953 Jonker ...................... F02K 3/11
  415/79
3,188,804 A    6/1965 Melenric
(Continued)

*Primary Examiner* — Ted Kim
(74) *Attorney, Agent, or Firm* — Bachman & LaPointe, PC

(57) ABSTRACT

The engine (10) includes a low spool (16) disposed aft of an air inlet (12) and a high spool (34) disposed aft of the low spool (16). An intake reverse-duct (44) is disposed radially outward of the high spool (34) and reverses direction of low pressure compressed air from the low spool (16) into a forward-flow high pressure compressor (40) of the high spool (34). A discharge reverse-manifold (48) directs flow of an exhaust gas stream (50} from a forward-flow low pressure turbine (20) into a rearward-flow direction and into at least one pulse detonation firing tube (54). An annular bypass air duct (72) directs cooling air along the engine (10)—The at least, one firing tube is positioned radially outward of the high spool (34), overlies the high spool (34) and is also positioned within the bypass air duct (72).

12 Claims, 2 Drawing Sheets

(51) Int. Cl.
    *F23R 7/00* (2006.01)
    *F02K 3/06* (2006.01)
    *F02C 5/02* (2006.01)
    *F02C 7/06* (2006.01)
    *F02C 7/36* (2006.01)
    *F23G 7/06* (2006.01)
    *F02C 3/107* (2006.01)

(52) U.S. Cl.
    CPC .... *F05D 2250/31* (2013.01); *F05D 2250/311* (2013.01); *F05D 2260/16* (2013.01)

(56) References Cited

U.S. PATENT DOCUMENTS

| | | | | |
|---|---|---|---|---|
| 3,677,012 | A * | 7/1972 | Batscha | F02K 3/065 |
| | | | | 60/262 |
| 6,477,829 | B1 * | 11/2002 | Hunter | F02K 3/00 |
| | | | | 60/225 |
| 2003/0182927 | A1 * | 10/2003 | Leyva | F02K 7/02 |
| | | | | 60/247 |
| 2011/0056208 | A1 | 3/2011 | Norris et al. | |
| 2011/0146232 | A1 * | 6/2011 | Westervelt | F02C 5/11 |
| | | | | 60/247 |
| 2012/0205188 | A1 * | 8/2012 | Fullerton | F02K 7/02 |
| | | | | 181/107 |
| 2013/0255224 | A1 * | 10/2013 | Kupratis | F02C 6/02 |
| | | | | 60/226.1 |

* cited by examiner

REVERSE-FLOW CORE GAS TURBINE ENGINE WITH A PULSE DETONATION SYSTEM

STATEMENT REGARDING FEDERALLY SPONSORED RESEARCH OR DEVELOPMENT

This disclosure was made with Government support under contract number FA 8650-09-D-2293 Order 0013 awarded by the United States Air Force. The Government has certain rights in this disclosure.

TECHNICAL FIELD

The present disclosure relates to reverse-flow core gas turbine engines and more specifically relates to a reverse-flow core gas turbine engine integrated with a pulse detonation system.

BACKGROUND ART

A "reverse-flow core gas turbine engine" refers to a gas turbine engine wherein flow of air through the engine is reversed after passing through a low pressure compressor. Reverse manifolding redirects rearward flowing air from the low pressure compressor to flow in a forward direction through a core of the engine. Exhaust ducting then re-directs an exhaust gas stream from the core to an engine exhaust. A reverse-flow core gas turbine engine is described in detail U.S. Pat. No. 8,176,725 that issued to Norris et al. on May 15, 2012, which patent is owned by the owner of all rights in the present application and which patent is also hereby incorporated herein by reference thereto.

Norris et al. resolves a problem associated with a low pressure shaft that connects a low pressure compressor and low pressure turbine being co-axial with a high pressure shaft that connects a high pressure turbine with a high pressure compressor in conventional gas turbine engines. Because the two shafts are co-axial, at least one of them must have a greater diameter and be made of stronger materials than would be required if the shaft could be shorter. By reversing the flow of the inlet air passing through the engine, a low spool may have a first or low pressure shaft connecting a low pressure compressor and a low pressure turbine, while a separate, non-coaxial, second or high pressure shaft connects a high pressure turbine with a high pressure compressor of a high spool.

In Norris et al., the low pressure compressor, low pressure shaft and the low pressure turbine are referred to as a "low spool". Similarly, the high pressure compressor, the high pressure turbine, a combustor between the high pressure compressor and high pressure turbine, and a high pressure shaft are referred to as a "high spool". More specifically, Norris et al. discloses that the low spool includes a rearward-flow low pressure compressor and a forward-flow low pressure turbine disposed aft of the rearward-flow low pressure compressor. The low pressure shaft is secured between the low pressure turbine and the low pressure compressor. The high spool is disposed aft the low spool and includes a forward-flow high pressure turbine disposed aft of the forward flow of the low pressure turbine, a combustor disposed aft of the forward-flow high pressure turbine, a forward-flow high pressure compressor disposed aft of the combustor. The high pressure shaft is secured between the high pressure turbine and the high pressure compressor. Because the two shafts are separate, the low pressure shaft may be shorter and narrower, as described above. Additionally, the high pressure shaft does not need to be wide enough accommodate the low pressure shaft, and therefore bath shafts and hence both spools and their associated rotors and discs comprising the turbine and compressors may be reduced in size and weight, thereby reducing costs associated with manufacturing parts from high strength engine alloys. An exemplary reverse-flow core gas turbine engine is the Honeywell ATF3 which is a 3-spool turbofan engine that has been in production for over twenty years with more than 200 engines in service. The ATF3 engine applications include the DASSAULT "Falcon 20G" brand aircraft used by the U.S. Coast Guard and the French Navy, and on the "Falcon 200" brand business jet.

It has become increasingly common to combine gas turbine engines with pulse detonation engines ("PDEs"). It is generally known that such engines operate by producing a series of pulsed detonations within one or more firing tubes of the engine. An oxidant such as atmospheric air and fuel are directed into an inlet of the firing tube and then combusted within the tube. This results in a dramatic pressure rise as a pressure wave of combusted oxidant and fuel moves along the firing tube increasing in velocity to produce a detonation wave that results in very substantial thrust as an exhaust stream passes out of an outlet of the firing tube.

It is also known that PDEs are combined with traditional gas turbine engines, wherein the exhaust stream from the pulse detonation engine ("PDE") is directed to flow into the turbine to drive the turbine. In such turbine hybrid PDEs, it is common that the turbine typically drives a compressor to force air into one or more of the firing tubes within the PDE. For example, U.S. Pat. No. 6,666,018 that issued on Dec. 23, 2003, to Butler et al. discloses a "combined cycle pulse detonation turbine engine" wherein a pulse detonation core is utilized to replace either a combustor of a core engine, or to replace a high pressure turbine, compressor and combustor of the engine.

Such combined as turbine and pulse detonation engines have not gained wide-spread usage because of many problems associated with extraordinary heat and vibration generated by operating PDEs as well as a substantial axial length of firing tubes of PDEs.

Therefore, there is a need for a gas turbine engine combined with a PDE that enhances efficiencies of the resulting engine.

SUMMARY OF THE INVENTION

The disclosure includes a reverse flow gas turbine engine having an air inlet and an engine exhaust aft of the air inlet. The engine includes a low spool disposed aft of the air inlet. The low spool has a rearward-flow low pressure compressor, and a forward-flow low pressure turbine disposed aft of the rearward-flow low pressure compressor. The low spool also has a low pressure shaft that is secured between the low pressure turbine and the low pressure compressor. The engine also includes a high spool disposed aft of the low spool. The high spool has a forward-flow high pressure turbine disposed aft of the forward-flow low pressure turbine, a combustor disposed aft of the forward-flow high turbine, and a forward-flow high pressure compressor disposed aft of the combustor. The high spool also has a high pressure shaft secured between the high pressure turbine and the high pressure compressor. An intake reverse-duct is disposed radially outward of the high spool for directing output of the rearward-flow low pressure compressor to the forward-flow high pressure compressor so that the output of the low pressure compressor reverses flow to pass through the high spool. A discharge reverse-manifold is disposed forward of the high spool and extends radially outward of the intake reverse-duct for receiving an exhaust gas stream from the forward-flow low pressure turbine and for directing the exhaust gas stream toward the engine exhaust. At least one pulse detonation firing tube is secured in fluid communication with the reverse discharge-duct. The at least one pulse detonation firing tube is positioned to be radially outward of and to overlie the high spool so that a portion of the pulse detonation firing tube intersects an axis that is perpendicular to an engine center line and that passes through the high spool. The firing tube is also configured to mix the exhaust gas stream with fuel so that the mixed fuel and exhaust gas stream detonates as the mixed fuel and exhaust gas stream pass through the firing tube toward the engine exhaust to thereby produce a pressure increase in the exhaust stream and enhanced thrust from the engine.

It can be seen that flow through the engine extends sequentially through the rearward-flow low pressure compressor in a downstream direction, through the intake reverse-duct to the forward-flow high pressure compressor, the combustor, the forward-flow high pressure turbine and the forward-flow low pressure turbine in a forward direction, and through the discharge reverse-manifold to a rearward direction through the at least one pulse detonation firing tube.

In at embodiment of the reverse-flow core gas turbine engine with a pulse detonation system, the engine includes a plurality of pulse detonation firing tubes, wherein each of the plurality of firing tubes is positioned about an equal distance from adjacent firing tubes, and wherein the plurality of firing tubes are positioned to surround the high spool. An exemplary number of firing tubes is between about 11 (eleven) and about 22 (twenty two) (For purposes herein, the word "about" is to mean plus or minus ten percent.) The plurality of pulse detonation tubes may be shock tubes utilizing shock-tube components to generate shock waves for detonating the exhaust stream gas and fuel. The plurality of pulse detonation firing tubes may also be constant volume combustor tubes, which means that each tube includes the same components only with different timing of activity within the tubes by different timing of control valve activity controlling flow through the tubes.

In a further embodiment including flow through the forward-flow low pressure turbine in a forward direction, and through the discharge reverse-manifold to a rearward direction through the at least one pulse detonation firing tube, the engine also includes an annular bypass duct surrounding and extending radially outward of the low spool and the high spool that directs bypass air from the air inlet to the exhaust of the engine. In this embodiment the one or more pulse detonation firing tubes are positioned within the annular bypass duct and exposed to cooling air passing through the bypass duct.

In an additional embodiment, the bypass air passing through the annular bypass duct is controlled to be at a pressure that is less than a pressure of the exhaust gas stream within a pre-detonation section of the tubes located upstream of a fuel inlet on the one or more pulse detonation firing tubes.

In a further embodiment of the reverse-flow core gas turbine engine with a pulse detonation system, the engine includes a plurality of groups of adjacent pulse detonation firing tubes, such as a group including a pair of adjacent tubes, or a group including three tubes, etc. Each of the plurality of groups of adjacent firing tubes is positioned so that each group is about an equal distance from a closest group of firing tubes, and wherein the plurality of groups of firing tubes are positioned to surround the high spool. An exemplary number of groups of adjacent firing tubes is between about 11 and about 22. As described above, the tubes of the plurality of groups of pulse detonation tubes may be shock tubes utilizing shock-tube components to generate shock waves for detonating the exhaust stream gas and fuel. The plurality of groups of adjacent pulse detonation firing tubes may also include constant volume combustor tubes using the same components with different timing of control valves.

The disclosure also includes a method of operating a gas turbine engine including directing flow of inlet air through an inlet of the engine and then compressing the air through a rearward-flow low pressure compressor in a downstream direction, then directing flow of the compressed air through an intake reverse-duct, and then into forward-flow high pressure compressor. The compressed, high pressure air is then directed into combustor and combusted therein with fuel. A combusted has stream is then directed through a forward-flow high pressure turbine and then through a forward-flow low pressure turbine in a forward direction. The exhaust gas stream is then directed forward of the low pressure turbine and through a discharge reverse-manifold and then in a rearward direction overlying the high spool through the at least one pulse detonation firing tube. Then the exhaust gas stream is mixed with fuel and pulse detonated within the at least one pulse detonation tube. It is pointed out that it is not necessary to add oxygen or air to the tube because the fuel-to-air ratio (e.g. 0.035) of the flow exiting the low pressure turbine is substantially below the stoichiometric fuel to air ratio (e.g., 0.067) necessary for detonation of the exhaust gas stream. The detonated exhaust stream is directed out of an outlet end of the firing tube and out of the engine exhaust.

Accordingly, it is a general purpose of the present disclosure to provide a reverse-flow core gas turbine engine with a pulse detonation system that overcomes deficiencies of the prior art.

It is a more specific purpose of the present disclosure to provide a reverse-flow core gas turbine engine with a pulse detonation system that reduces an overall axial length of the engine, and that enhances cooling of pulse detonation firing tubes of the engine.

These and other purposes and values of the present disclosure will become more readily apparent in the following detailed description and the accompanying drawings.

DESCRIPTION OF THE PREFERRED EMBODIMENTS

Figure 1:
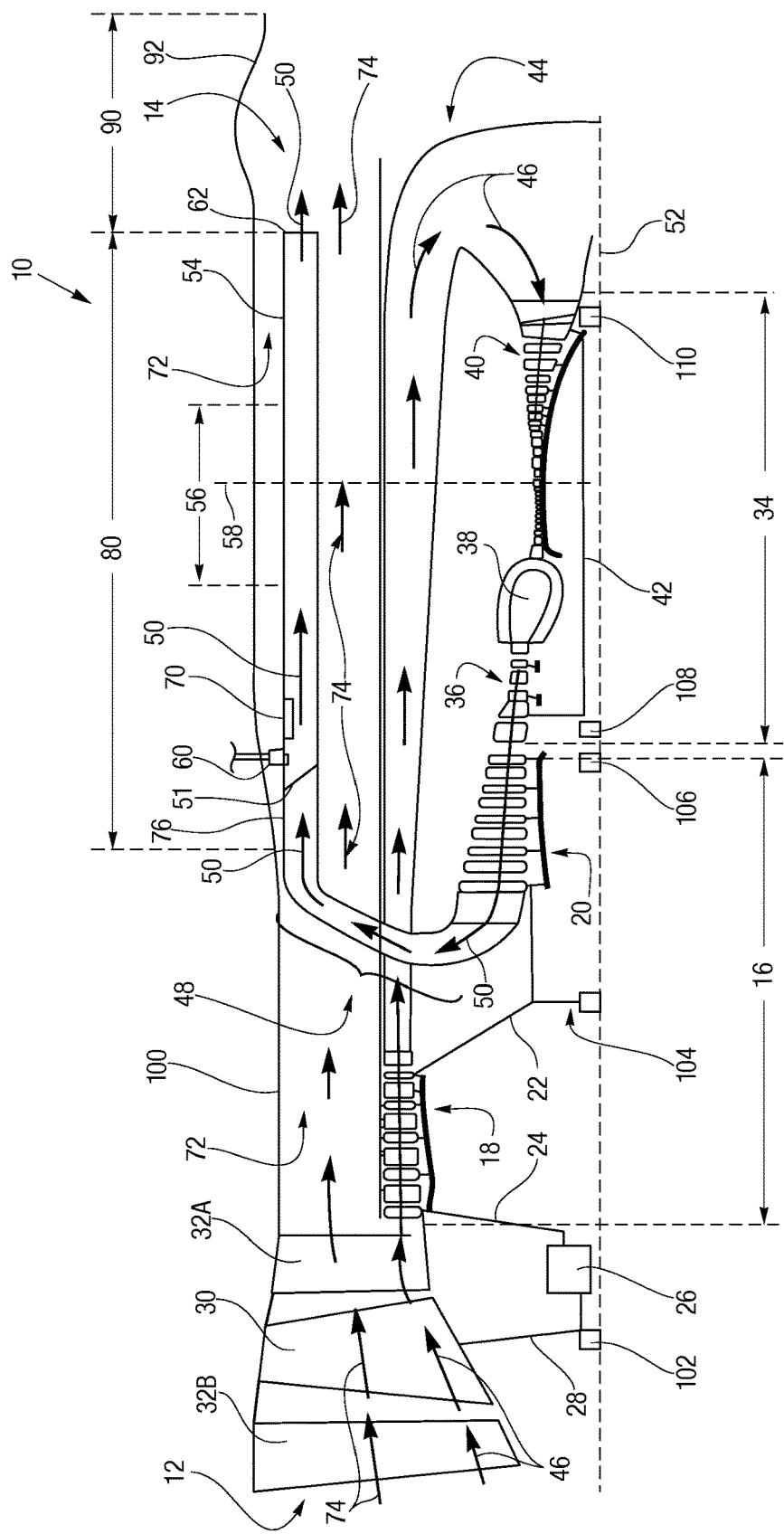
FIG. 1 is a simplified, schematic drawing of a reverse-flow core gas turbine engine with a pulse detonation system constructed in accordance with the present disclosure.

Referring to the drawings in detail, FIG. 1 shows a simplified, schematic representation of a reverse-flow core gas turbine engine with a pulse detonation system, and is generally designated by reference numeral 10. The engine 10 includes an air inlet 12 and an engine exhaust 14 aft of the air inlet 12. The engine 10 also includes a low spool 16 disposed aft of the air inlet 12. (For purposes herein, the word "aft", such as used in the previous sentence, is to mean that the low spool 16 is disposed. Within the engine 10 at a position relative to the air inlet 12 that closer to the engine exhaust 14 than is the air inlet 12.)

The low spool 16 has a rearward-flow low pressure compressor 18. (For purposes herein the phrase "rearward-flow", as used in the previous sentence, is to mean that flow of air through the low pressure compressor flows in a direction toward the engine exhaust 14.) The low spool 16 also includes a forward-flow low pressure turbine 20 disposed aft of the rearward-flow low pressure compressor 18. (For purposes herein, the phrase "forward-flow", as used in the previous sentence, is to mean that flow through the low pressure turbine 20 is in a direction toward the air inlet 12 of the engine 10.) The low spool 16 also has a low pressure shaft 22 that is secured between the low pressure turbine 20 and the low pressure compressor 18. The engine 10 may also include gear shaft 24 secured between the low pressure compressor 18 and a fan gear be 26 for controlling a fan shaft 28 to rotate a fan 30 within the air inlet 12. The engine 10 may also include fan guide vanes 32A, 32B secured within the air inlet 12 adjacent opposed sides of the fan 30, if the engine 10 is a turbo fan form of a gas turbine engine.

The engine also includes a high spool 34 disposed aft of the low spool 16. The high spool 34 has a forward-flow high pressure turbine 36 disposed aft of the forward-flow low pressure turbine 20. A combustor 38 is disposed aft of the forward-flow high pressure turbine 36, and a forward-flow high pressure compressor 40 is disposed aft of the combustor 38. The high spool 34 also has a high pressure shaft 42 secured between the high pressure turbine 36 and the high pressure compressor 40. (It is noted that FIG. 1 is a schematic, simplified representation of the present disclosure. Components, such as the low pressure shaft 22 and high pressure shaft 42 are shown schematically only, and their representation in FIG. 1 is only to show relative interconnections, and is not to be interpreted as representing an actual shape or form of the shafts 22, 42 or of any other components.) The exemplary reverse-flow core gas turbine engine 10 generally includes the low speed spool 16 and the high spool 34 mounted for rotation about an engine central longitudinal axis 52 relative to an engine static structure 100 or housing via a plurality of bearing systems, such as a first bearing system 102, a second bearing system 104 (including a, a third bearing system 106, a fourth bearing system 108 and a fifth bearing system 110. It is to be understood that various bearing systems at various engine 10 locations may alternatively or additionally be provided.

An intake reverse-duct 44 is disposed radially outward of the high spool 31 and is configured for directing output of the rearward-flow low pressure compressor 18 to flow into the forward-flow high pressure compressor 40. In other words, the output of the low pressure compressor 18 reverses flow within the intake reverse-duct 44 to pass through the high spool 34 in a forward direction. FIG. 1 includes direction of flow arrows 46 for working air passing through the engine 10 and the arrows 46 show the change of direction of the working air passing through the intake reverse-duct 44.

A discharge reverse-manifold 48 is disposed forward of the high spool 34 and extends radially outward of the intake reverse-duct 44 for receiving an exhaust gas stream 50 from the forward-flow low pressure turbine 20 and for directing the exhaust gas stream 50 toward the engine exhaust 14. (For purposes herein, the phrase "radially outward", as used in the previous sentence, is to mean that the identified component, namely the extension of the discharge reverse-manifold 48, is further from the engine 10 longitudinal axis or center line 52 than is the intake reverse-duct 44.)

At least one pulse detonation firing tube 54 is secured in fluid communication with the reverse discharge-duct 48. The at least one pulse detonation firing tube 54 is positioned to overlie the high spool 34. (For purpose herein, the word "overlie" as used in the previous sentence, is to mean that at least a portion 56 of the pulse detonation firing tube 54 intersects an axis 58 that is perpendicular to the center line 52 and that passes through the high spool 34.) The firing tube 54 is also configured to mix the exhaust gas stream 50 with fuel, received through a fuel inlet 60 in the tube 54, so that the mixed fuel and exhaust gas stream 50 pulse detonates as the mixed fuel and exhaust gas stream 50 are directed by control valves 51 through the firing tube 54 and out of the firing tube 51 through an outlet end 62 of the tube 54. The detonated exhaust gas stream 50 passes through the tube 54 in a direction toward the engine exhaust 14. Pulsed detonation of the exhaust gas stream 50 produces a pressure increase in the exhaust stream within the tube 54 that results in enhanced thrust for the engine 10 as the detonated exhaust stream passes out of the outlet end 62 of the firing tube 54.

As described above, flow of the working gas, such as the atmosphere, through the engine 10, as shown by the flow direction arrows 46, extends sequentially first through the rearward-flow low pressure compressor 18 in a downstream direction toward the engine exhaust 12. Then, the flow moves through the intake reverse-duct 44 to the forward-flow high pressure compressor 40, then the combustor 38, the forward-flow high pressure turbine 36 and then the forward-flow low pressure turbine 20 in a forward direction, or toward the air inlet 12. After combustion in the combustor 38, the working gas is referred to as the exhaust gas stream 50 and flows through the discharge reverse-manifold 48 to flow in a rearward direction through the at least one pulse detonation firing tube 54.

Figure 2:
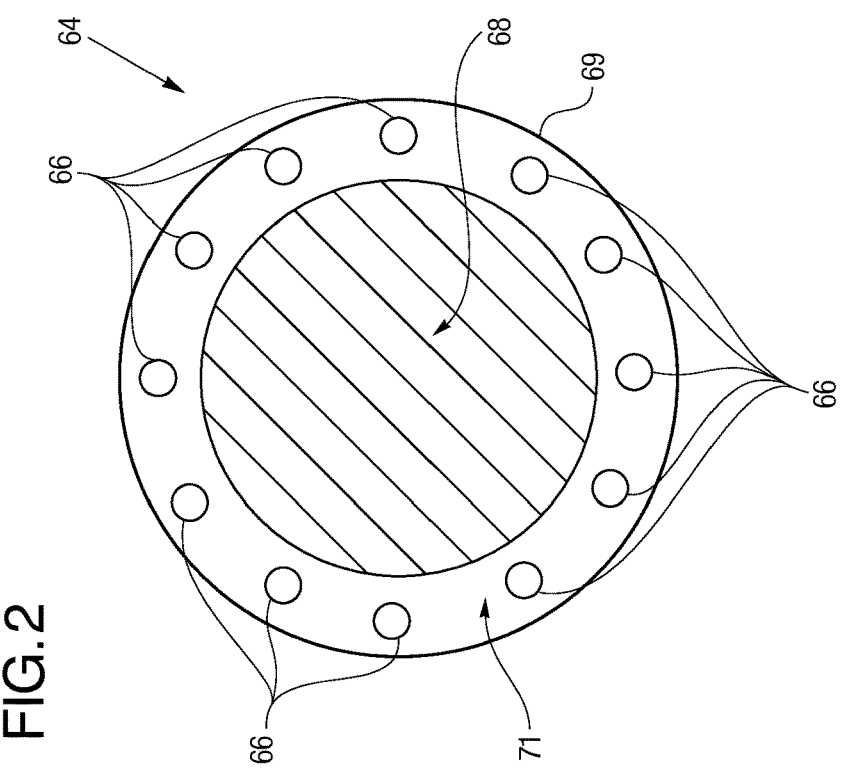
FIG. 2 is a simplified, schematic, cross-sectional view of a reverse-flow core gas turbine engine with a pulse detonation system, showing twelve pulse detonation firing tubes surrounding a core of the engine.

FIG. 2 shows a cross-sectional view of an alternative, multi-tube embodiment 64 of a reverse-flow core gas turbine engine with a pulse detonation system 64. In the multi-tube embodiment 64, the engine 64 may include a plurality of pulse detonation firing tubes 66 surrounding a high spool 68 of the multi-tube engine 64 and positioned between the high spool 68 and an outer casing 69 within a bypass air cooling passage 71. As shown in FIG. 2, each of the plurality of firing tubes 66 is positioned about an equal distance from adjacent firing tubes 66. An exemplary number of firing tubes 66 is between about 11 and about 22.

Figure 3:
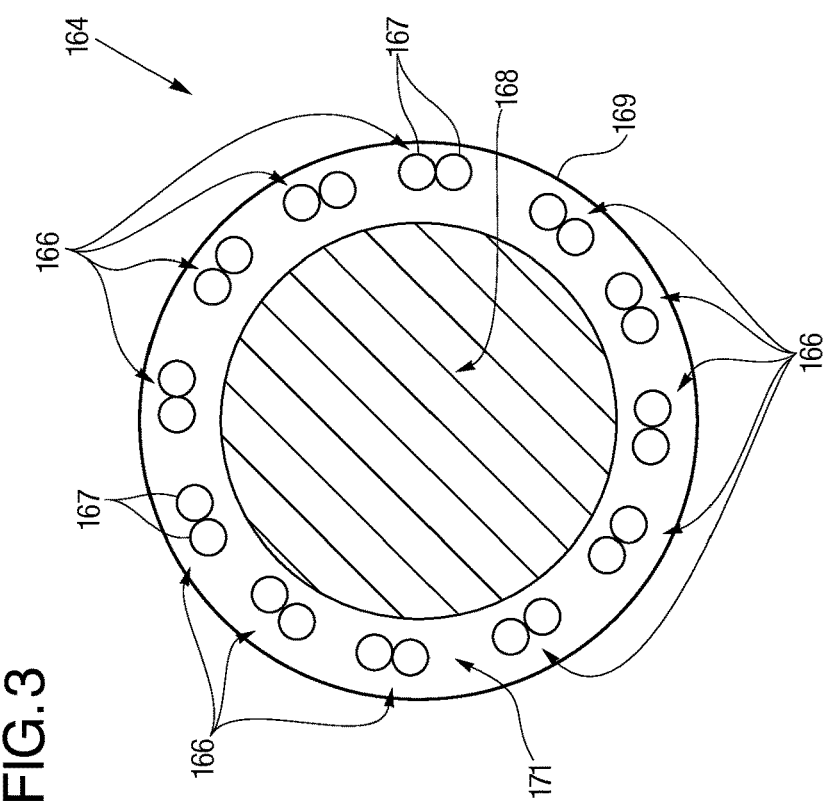
FIG. 3 is a simplified, schematic, cross-sectional view of a reverse-flow core gas turbine engine with a pulse detonation system, showing twelve groups of adjacent pulse detonation firing tubes surrounding a core of the engine.

FIG. 3 shows a second alternative multi-tube embodiment 164 of a reverse-flow core gas turbine. engine with a pulse detonation system 164. In the FIG. 3 embodiment of the engine 164, a plurality of groups 166 of adjacent pulse detonation firing tubes 167, such as group 166 including a pair of adjacent tubes 167, or a group including three tubes 67 (not shown), etc. Each of the plurality of groups 166 of adjacent firing tubes 167 is positioned so that each group 166 is about an equal distance from a closest group 166 of firing tubes 167, and wherein the plurality of groups 166 of firing tubes are positioned to surround the high spool 168 of the second multi-tube embodiment 164. An exemplary number of groups 166 of adjacent firing tubes 167 is between about 11 and about 22. As with the FIG. 2 embodiment, the FIG.

3 embodiment also includes an outer casing 169 that defines a cooling passage 171 between the casing 169 and the high spool 168.

As shown in FIG. 1, the at least one pulse detonation tube 54, as well as the plurality of tubes 66 in FIG. 2, may be a shock tube 54 utilizing shock-tube components 70 to generate shock waves for detonating the exhaust gas stream 50 and fuel added through the fuel inlet 60 to the tube 54. As is known to those skilled in the art, the shock tube 54 may accomplish pulse detonation of the gas and fuel in various types of detonation chambers (not shown). Such chambers include detonation tubes 54, 66, 167 resonating detonation cavities, annular detonation chambers, etc. The shock tube 54 may have a circular cross-sectional profile. The pulse detonation firing tube 54 or shock tube 54 may also be constant volume combustor tubes, using the same components for each firing tube 54, but with different timing of the control valve 51.

FIG. 1 also shows that the engine 10 may include an annular bypass duct 72 surrounding and extending radially outward of the low spool 16 and the high spool 34. The bypass duct 72 directs bypass air from the air inlet 12 to the exhaust 14 of the engine 10. FIG. 1 also includes direction of flow arrows 74 for by-pass air passing through the engine 10 from the air inlet 12 to the engine exhaust 14. FIG. 1 shows that the one or more pulse detonation firing tubes 54 are positioned within the annular bypass duct 72 and are exposed to cooling air passing through the bypass duct 72. FIG. 1 also shows a nozzle 90 including an outline of an exhaust nozzle 92 which receives flow from the engine exhaust 14 and the mixed flow of the by-pass air and the exhaust gas stream 50. It is to be understood that various fixed, variable, convergent/divergent, two-dimensional and three-dimensional exhaust nozzles may be utilized herewith.

As described above, there, is no need to admit oxygen or atmospheric air in to the firing tubes because the flow exiting the forward-flow low pressure turbine 20 is substantially below the stoichiometric fuel to air ratio (e.g., 0.067) necessary for detonation of the exhaust gas stream 50. The pulse detonation firing tube 54, or groups 166 of adjacent firing tubes 167, fuel inlet. 60 on the tube 54, pre-detonation section 76 of the tube 54, shockwave components 70 and outlet end 62 of the tube 54 form a pulse detonation system 80 of the reverse-flow core gas turbine engine 10.

The present disclosure also provides for a method of operating the gas turbine engine 12 including a sequence of steps. The sequence includes, first, directing flow of the inlet air through the air inlet 12 of the engine 10 and then compressing the air through the rearward-flow low pressure compressor 18 in a downstream direction. Second, then directing flow of the compressed air through the intake reverse-duct 44, and then into the forward-flow high pressure compressor 40. The compressed, high pressure air is then directed into the combustor 38 and is combusted therein with fuel. The combusted exhaust gas stream 50 is then directed through the forward-flow high pressure turbine 36 and then through the forward-flow low pressure turbine 20 in a forward direction. The exhaust gas stream 50 is then directed forward of the low pressure turbine 20 and through the discharge reverse-manifold 48 and then in a rearward direction overlying the high spool 34 through the at least one pulse detonation firing tube 54 or groups 166 of adjacent firing tubes 167. Then the fuel and exhaust gas stream 50 mixtures is pulse detonated within the at least one pulse detonation tube 54 or groups 166 of adjacent tubes 167. The detonated exhaust gas stream 50 is directed out of the outlet end 62 of the firing tube 51 and out the engine 10 through the engine exhaust 14.

By having the pulse detonation firing tube 54 and/or the plurality of pulse detonation firing tubes 66 positioned to overlie the high spool 34, 68, the present disclosure provides for a substantially reduced overall axial length of the engine 10 between the air inlet 12 and the engine exhaust 14, while increasing the thrust of the engine 10 through use of the pulse detonation firing system 80. Additionally, by having the pulse detonation system 80 positioned within the bypass air duct 72, the present disclosure provides for extraordinarily efficient cooling of the pulse detonation firing tubes 54 within the compact profile of the present reverse-flow core gas turbine engine 10.

While the above disclosure has been presented with respect to the described and illustrated embodiments of a reverse-flow core gas turbine engine 10 with a pulse detonation system 80, it is to be understood that the disclosure is not to be limited to those alternatives and described embodiments. For example, while the engine 10 includes a fan 30 and fan gear box 26 to drive the fan from the to pressure compressor 18, it is to be understood that the present disclosure applies to all forms of reverse flow core gas turbine engines, including turbo fans, etc. Accordingly, reference should be made primarily to the following claims rather than the foregoing description to determine the scope of the disclosure.

What is claimed is:

1. A reverse-flow core gas turbine engine having an air inlet and an engine exhaust aft of the air inlet, the engine comprising:
   a. a low spool disposed aft of the air inlet including a rearward-flow low pressure compressor, and a forward-flow low pressure turbine disposed aft of the rearward-flow low pressure compressor;
   b. a high spool disposed aft of the low spool, the high spool including a forward-flow high pressure turbine disposed aft of the forward-flow low pressure turbine, a combustor disposed aft of the forward-flow high pressure turbine, and a forward-flow high pressure compressor disposed aft of the combustor;
   c. an intake reverse-duct disposed radially outward of the high spool for directing output of the rearward-flow low pressure compressor to the forward-flow high pressure compressor so that the output reverses from rearward-flow to forward-flow to pass through the high spool;
   d. a discharge reverse-manifold disposed forward of the high spool and radially outward of the intake reverse-duct for receiving an exhaust gas stream from the forward-flow low pressure turbine and for directing the exhaust gas stream from forward-flow to rearward-flow toward the engine exhaust;
   e. a pulse detonation system including at least one pulse detonation firing tube secured in fluid communication with the discharge reverse-manifold, the at least one pulse detonation firing tube positioned to be radially outward of and to overlie the high spool so that a portion of the pulse detonation firing tube intersects an axis that is perpendicular to an engine center line and which axis passes through the high spool; and,
   f. the at least one pulse detonation firing tube being configured to mix all of the exhaust gas stream with fuel so that the mixed fuel and exhaust gas stream pulse detonates as the mixed fuel and exhaust gas stream pass through the firing tube toward the engine exhaust, wherein the engine further comprises an annular bypass duct surrounding and extending radially outward of the low spool and the high spool that directs bypass air from the air inlet to the exhaust of the engine, and wherein the one or more pulse detonation firing tubes are positioned within the annular bypass duct and exposed to cooling air passing through the bypass duct, the one or more pulse detonation firing tubes defining two separate flow paths within the annular bypass duct, wherein the first flow path is through the pulse detonation firing tubes and carries the exhaust gas stream from the discharge reverse-manifold, and wherein the second flow path is in the annular bypass duct outside of the pulse detonation firing tubes and carries bypass air.

2. The reverse-flow core gas turbine engine of claim 1, further comprising a plurality of pulse detonation firing tubes, wherein each of the plurality of firing tubes is positioned about an equal distance from adjacent firing tubes, and wherein the plurality of firing tubes are positioned to surround the high spool of the engine.

3. The reverse-flow core gas turbine engine of claim 2, wherein the plurality of pulse detonation firing tubes includes between about eleven and about twenty-two firing tubes.

4. The reverse-flow core gas turbine engine of claim 1, further comprising a plurality of pulse detonation firing tubes and wherein the plurality of firing tubes comprise constant volume combustor tubes.

5. The reverse-flow core gas turbine engine of claim 1, further comprising a plurality of groups of adjacent pulse detonation firing tubes, each of the plurality of groups of adjacent firing tubes being positioned so that each group is about an equal distance from a closest group of firing tubes, and the groups of adjacent pulse detonation firing tubes being positioned to surround the high spool of the engine.

6. A reverse-flow core gas turbine engine having an air inlet and an engine exhaust aft of the air inlet, the engine comprising:
 a. a low spool disposed aft of the air inlet including a rearward-flow low pressure compressor, a forward-flow low pressure turbine disposed aft of the rearward-flow low pressure compressor and a low pressure shaft secured between the low pressure turbine and the low pressure compressor;
 b. a high spool disposed aft of the low spool, the high spool including a forward-flow high pressure turbine disposed aft of the forward-flow low pressure turbine, a combustor disposed aft of the forward-flow high pressure turbine, a forward-flow high pressure compressor disposed aft of the combustor, and a high pressure shaft secured between the high pressure turbine and the high pressure compressor;
 c. an intake reverse-duct disposed radially outward of the high spool for directing output of the rearward-flow low pressure compressor to the forward-flow high pressure compressor so that the output reverses from rearward-flow to forward-flow to pass through the high spool;
 d. a discharge reverse-manifold disposed forward of the high spool and radially outward of the intake reverse-duct for receiving an exhaust gas stream from the forward-flow low pressure turbine and for directing the exhaust gas stream from forward-flow to rearward-flow toward the engine exhaust;
 e. a pulse detonation system including at least one pulse detonation firing tube secured in fluid communication with the discharge reverse-manifold, the at least one pulse detonation firing tube positioned to be radially outward of and to overlie the high spool so that a portion of the pulse detonation firing tube intersects an axis that is perpendicular to an engine center line and which axis passes through the high spool;
 f. the at least one pulse detonation firing tube being configured to mix all of the exhaust gas stream with fuel so that the mixed fuel and exhaust gas stream pulse detonates as the mixed fuel and exhaust gas stream pass through the firing tube toward the engine exhaust, wherein the engine further comprises an annular bypass duct surrounding and extending radially outward of the low spool and the high spool that directs bypass air from the air inlet to the exhaust of the engine, and wherein the one or more pulse detonation firing tubes are positioned within the annular bypass duct and exposed to cooling air passing through the bypass duct, the one or more pulse detonation firing tubes defining two separate flow paths within the annular bypass duct, wherein the first flow path is through the pulse detonation firing tubes and carries the exhaust gas stream from the discharge reverse-manifold, and wherein the second flow path is in the annular bypass duct outside of the pulse detonation firing tubes and carries bypass air; and
 g. wherein flow through the engine extends sequentially through the rearward-flow low pressure compressor in a downstream direction, through the intake reverse-duct to the forward-flow high pressure compressor, the combustor, the forward-flow high pressure turbine and the forward-flow low pressure turbine in a forward direction, and through the discharge reverse-manifold to a rearward direction through the at least one pulse detonation firing tube.

7. The reverse-flow core gas turbine engine of claim 6, further comprising a plurality of pulse detonation firing tubes, wherein each of the plurality of firing tubes is positioned about an equal distance from adjacent firing tubes, and wherein the plurality of firing tubes are positioned to surround the high spool of the engine.

8. The reverse-flow core gas turbine engine of claim 6, wherein the one or more pulse detonation firing tubes comprise pulse detonation shock tubes.

9. A method of operating a reverse-flow gas turbine engine, the method comprising:
 a. directing flow of inlet air through an air inlet of the engine;
 b. then, compressing the air in a downstream direction through a rearward-flow low pressure compressor of a low spool of the engine;
 c. then, directing flow of the compressed air through an intake reverse-duct, and then into a forward-flow high pressure compressor, then combusting the compressed air by directing the compressed air with fuel through a combustor, then directing a combusted gas stream from the combustor and through a forward-flow high pressure turbine of a high spool, and then through a forward-flow low pressure turbine in a forward direction;
 d. then, directing all of the exhaust gas stream from the forward-flow low pressure turbine through a discharge reverse-manifold and then in a rearward direction through at least one pulse detonation firing tube overlying the high spool; and
 e. mixing all of the exhaust gas stream with fuel within the at least one pulse detonation firing tube and pulse detonating the mixed fuel and exhaust gas stream within the at least one pulse detonation firing tube, wherein the engine further comprises an annular bypass duct surrounding and extending radially outward of the low spool and the high spool that directs bypass air from the air inlet to the exhaust of the engine, and wherein the one or more pulse detonation firing tubes are positioned within the annular bypass duct and exposed to cooling air passing through the bypass duct, the one or more pulse detonation firing tubes defining two separate flow paths within the annular bypass duct, wherein the first flow path is through the pulse detonation firing tubes and carries the exhaust gas stream from the discharge reverse-manifold, and wherein the second flow path is in the annular bypass duct outside of the pulse detonation firing tubes and carries bypass air.

10. A method of operating the reverse-flow gas turbine engine of claim 9, further comprising directing the exhaust gas stream from the forward-flow low pressure turbine through a plurality of pulse detonation firing tubes positioned about an equal distance from adjacent firing tubes and positioned to surround the high spool of the engine.

11. A method of operating the reverse-flow gas turbine engine of claim 9, further comprising directing the exhaust gas stream from the forward-flow low pressure turbine through a plurality of groups of adjacent pulse detonation firing tubes positioned so that each group is about an equal distance from a closest group of firing tubes, and positioned to surround the high spool of the engine.

12. A method of operating the reverse-flow gas turbine engine of claim 9, wherein the step of directing the exhaust gas stream through at least one pulse detonation firing tube overlying the high spool further comprises generating shock waves within the at least one pulse detonation firing tube.

* * * * *